(12) United States Patent
Kakitsuba et al.

(10) Patent No.: US 11,651,178 B2
(45) Date of Patent: May 16, 2023

(54) NON-TRANSITORY STORAGE MEDIUM STORING PLURALITY OF INSTRUCTIONS AND PRINT DATA GENERATING APPARATUS

(71) Applicant: BROTHER KOGYO KABUSHIKI KAISHA, Nagoya (JP)

(72) Inventors: Ryota Kakitsuba, Nagoya (JP); Mareyuki Murata, Gifu (JP); Yushi Ichikawa, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 17/514,189

(22) Filed: Oct. 29, 2021

(65) Prior Publication Data

US 2022/0138517 A1    May 5, 2022

(30) Foreign Application Priority Data

Oct. 29, 2020  (JP) .............................. JP2020-181908
Jun. 4, 2021   (JP) .............................. JP2021-094818

(51) Int. Cl.
G06K 15/02    (2006.01)
H04N 1/00     (2006.01)
G06K 15/10    (2006.01)

(52) U.S. Cl.
CPC ....... G06K 15/1832 (2013.01); G06K 15/102 (2013.01); H04N 1/0044 (2013.01); H04N 1/0048 (2013.01)

(58) Field of Classification Search
CPC .................................................. G06K 15/1832
USPC ........................................................ 358/1.15
See application file for complete search history.

(56) References Cited

U.S. PATENT DOCUMENTS

| | | | | |
|---|---|---|---|---|
| 2002/0054343 | A1* | 5/2002 | Nagata | G06F 3/1286 358/1.15 |
| 2005/0200861 | A1 | 9/2005 | Kubota | |
| 2011/0176172 | A1* | 7/2011 | Nakata | G06F 3/1253 358/1.15 |
| 2022/0006918 | A1* | 1/2022 | Suzuki | H04N 1/6008 |

FOREIGN PATENT DOCUMENTS

JP        2005-115528 A      4/2005

* cited by examiner

*Primary Examiner* — Jacky X Zheng
(74) *Attorney, Agent, or Firm* — Scully, Scott, Murphy & Presser, PC

(57) ABSTRACT

A non-transitory storage medium stores a plurality of instruction readable by a computer of an information processing apparatus. When executed by the computer, the plurality of instruction cause the information processing apparatus to determine a generating condition such that a number of pixels of the bitmap image in a particular direction is less than or equal to a particular number, obtain the first bitmap data satisfying the generating condition by using the generating condition, determine a magnification condition for magnifying the first bitmap data based on condition information indicating a printing condition, obtain second bitmap data by using the magnification condition, and generate print data by using the second bitmap data.

14 Claims, 8 Drawing Sheets

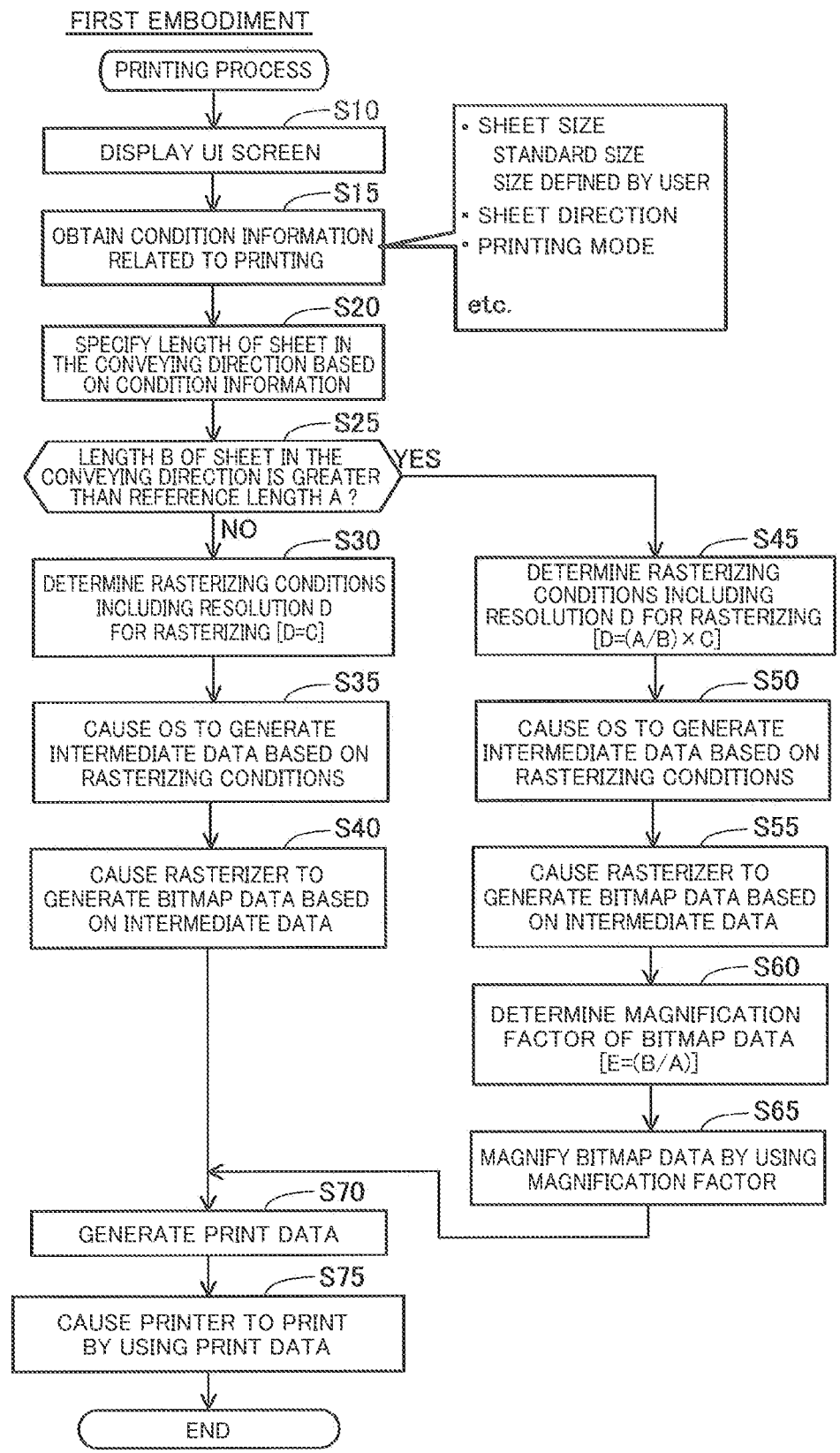

FIG.4A

FIRST EMBODIMENT

PRINTING SETTING — WI1

SHEET SIZE — PM1
- A4
- A3
- ELONGATED SHEET
- SIZE DEFINED BY USER

SHEET DIRECTION
- RB1 ● VERTICAL DIRECTION
- RB2 ○ HORIZONTAL DIRECTION

COLOR MODE
- RB3 ● MONOCHROME
- RB4 ○ COLOR

PRINT QUALITY
- RB5 ● HIGH QUALITY
- RB6 ○ NORMAL QUALITY

BTs: SIZE DEFINED BY USER SETTING

BT1: PRINT  BT2: CANCEL

FIG.4B

SIZE DEFINED BY USER — WI2

UNIT
- RB7 ● mm
- RB8 ○ inch

WIDTH: IS1 = 300

HEIGHT: IS2 = 450

BT3: OK  BT4: CANCEL

SECOND EMBODIMENT

NON-TRANSITORY STORAGE MEDIUM STORING PLURALITY OF INSTRUCTIONS AND PRINT DATA GENERATING
APPARATUS

CROSS REFERENCE TO RELATED APPLICATION

The present application claims priorities from Japanese Patent Applications Nos. 2020-181908 and 2021-094818, which were respectively filed on Oct. 29, 2020 and Jun. 4, 2021, the disclosures of which are herein incorporated by reference in their entirety.

BACKGROUND

The following disclosure relates to a technique configured to control a print executing device.

In an ink-jet type serial printer configured to print by executing a plurality of scanning of a printer head, there has been known a technique in which printing is executed on a sheet, a length of which in a conveying direction in printing is greater than that of a normal printing medium such as the A4, B5, or L size, and the sheet may be hereinafter referred to as "an elongated sheet". For example, there has been an ink-jet printer configured to print without creating margins of pages, so-called borderless printing, on a roll sheet.

SUMMARY

To execute printing on the elongated sheet, a size of bitmap data used in generating print data may increase. Due to this, when an application does not expect, in the middle of generating print data, generating a size of the bitmap data corresponding to the elongated sheet, there is a possibility of being unable to appropriately execute a bitmap generating process in which the bitmap data is generated by using vector data generated by the application. In this case, there is a possibility of being unable to appropriately generate the print data based on the vector data.

An aspect of the disclosure relates to a technique capable of appropriately generating the print data based on the vector data generated by the application.

In one aspect of the disclosure, a non-transitory storage medium stores a plurality of instruction readable by a computer of an information processing apparatus. When executed by the computer, the plurality of instruction cause the information processing apparatus to determine a generating condition for generating first bitmap data indicating a bitmap image such that a number of pixels of the bitmap image in a particular direction is less than or equal to a particular number, obtain the first bitmap data satisfying the generating condition by using the generating condition, the obtained first bitmap data being data generated based on vector data generated by an application program, determine a magnification condition for magnifying the first bitmap data based on condition information indicating a printing condition, obtain second bitmap data by using the magnification condition, the obtained second bitmap data being data generated by magnifying the first bitmap data based on the magnification condition, and generate print data by using the second bitmap data.

In another aspect of the disclosure, a print data generating apparatus includes a display; and a controller. The controller is configured to determine a generating condition for generating first bitmap data indicating a bitmap image such that a number of pixels of the bitmap image in a particular direction is less than or equal to a particular number, obtain the first bitmap data satisfying the generating condition by using the generating condition, the obtained first bitmap data being data generated based on vector data generated by an application program, determine a magnification condition for magnifying the first bitmap data based on condition information indicating a printing condition, obtain second bitmap data by using the magnification condition, the obtained second bitmap data being data generated by magnifying the first bitmap data based on the magnification condition, and generate print data by using the second bitmap data.

BRIEF DESCRIPTION OF THE DRAWINGS

The objects, features, advantages, and technical and industrial significance of the present disclosure will be better understood by reading the following detailed description of the embodiments, when considered in connection with the accompanying drawings, in which:

FIG. 3 is a flowchart of a printing process of the first embodiment;

FIG. 4A illustrates one example of a UI screen for inputting printing instructions;

FIG. 4B illustrates one example of a UI screen for inputting a size defined by a user;

DETAILED DESCRIPTION OF THE EMBODIMENTS

First Embodiment

Configuration of Printing System 1000

Figure 1:
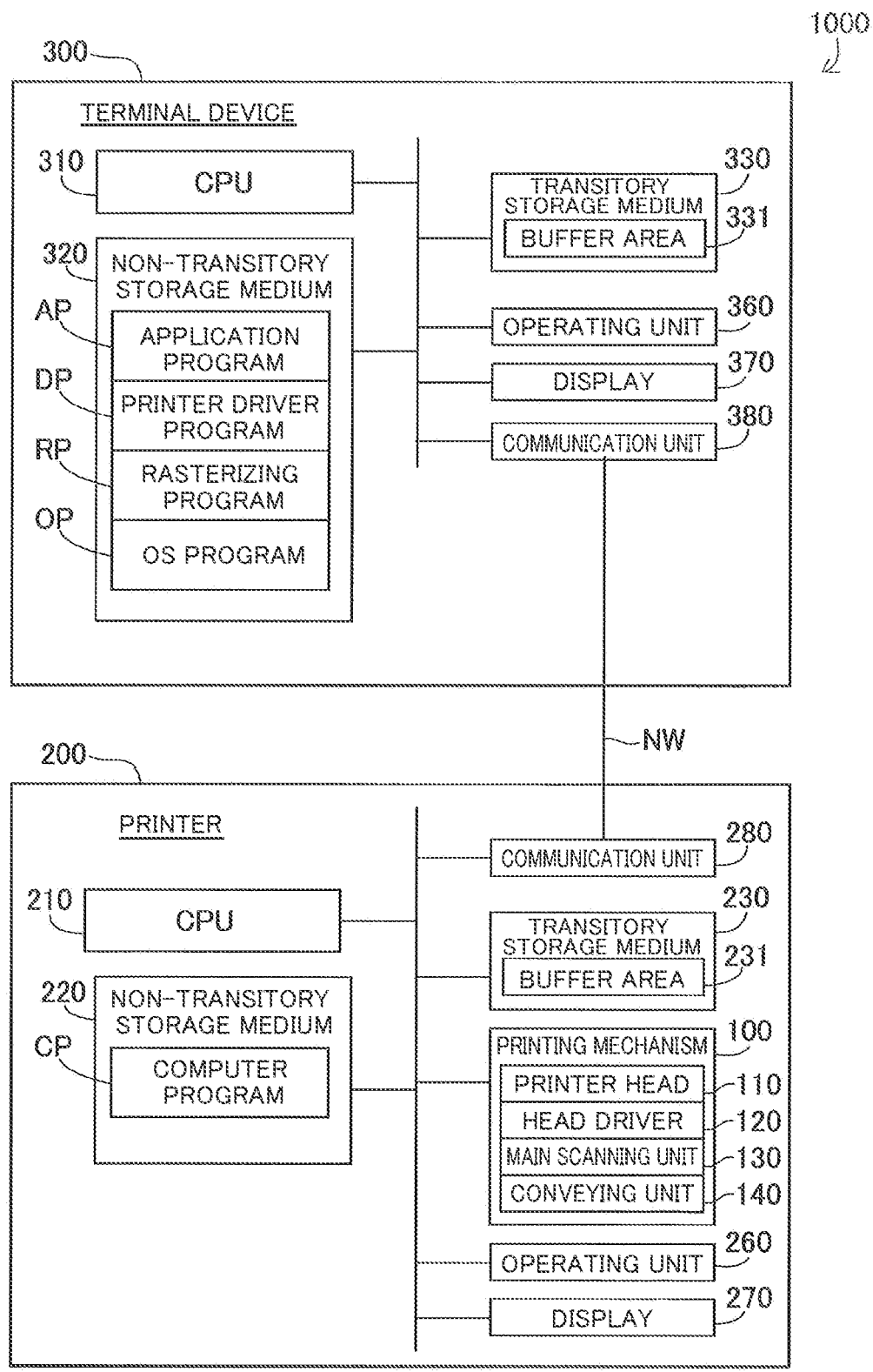
FIG. 1 is a block diagram illustrating a printing system of a first embodiment.

There will be described a first embodiment of this disclosure in detail. FIG. 1 is a block diagram illustrating a printing system 1000 of a first embodiment.

The printing system 1000 includes a printing system 200 and a terminal device 300 as an image processing apparatus of the present embodiment. The printing system 200 and the terminal device 300 are connected to each other so as to be communicatable through a wired or wireless network NW.

The terminal device 300 is a computer, for example, a personal computer or a smart phone, used by a user of the printing system 200. The terminal device 300 comprises a CPU 310 as a controller of the terminal device 300, a non-transitory storage medium 320 such as a hard disk drive, a transitory storage medium 330 such as a RAM, an operating unit 360 such as a mouse or a keyboard, a display 370 such as a liquid crystal display, and a communication unit 380. The communication unit 380 includes a wired or wireless interface for connecting the network NW.

The transitory storage medium 330 provides a buffer area 331 for the CPU 310. In the non-transitory storage medium 320, a plurality of computer programs, specifically, an application program AP, a printer driver program DP, a rasterizing program RP, and an OS program OP are stored.

The application program AP is a program configured to cause the CPU 310 to execute a function of processing image data, for example, a program capable of executing a word processing function, or a program capable of executing a document viewer function. The application program AP includes a program that executes a function in which the program starts the printer driver program DP and instructs the printer driver program DP to print an image indicated by the image data processed by the application. In the following description, a function executed by the CPU 310 by executing the application program AP may be hereinafter referred to as "an application" The application program AP is provided by a manufacture of the application program AP in the manner of, for example, downloading from a server, or being stored in DVD-ROM, and so on.

The printer driver program DP is a program causes, in accordance with an instruction of the application, the CPU 310 to execute a function in which the CPU 310 causes the printing system 200 to print images by using image data obtained from the application the application. In the following description, a function executed by the CPU 310 by executing the printer driver program DP may be hereinafter referred to as "a printer driver" The printer driver program DP is provided by a manufacture of the printing system 200 in the manner of, for example, downloading from a server, or being stored in DVD-ROM, and so on.

The OS program OP is a program causes the CPU 310 to execute a function as an operating system (OS). In the present embodiment, the OS is Windows (registered trademark). The OS program may be Android (registered trademark), iOS (registered trademark), or other programs.

The rasterizing program RP is a program that causes the CPU 310 to execute a function in which the CPU 310 executes a process of converting image data (referred to as a vector data) written in a predetermined description language to bitmap data such as RGB image data (rasterizing). The vector data is a set of rendering commands. In the present embodiment, the rasterizing program RP is GDI (Graphic Device Interface) provided as a component of Windows OS. The rasterizing program RP may be a program corresponding to other OS programs. In the following description, a function executed by the CPU 310 by executing the rasterizing program RP may be referred to as "a rasterizer". The OS program OP and the rasterizing program RP are provided by a manufacture of the OS program OP in the manner of, for example, being installed on a non-transitory storage medium 320 when the terminal device 300 is manufactured. The OS program OP and the rasterizing program RP may be provided in the manner of downloading from a server, or being stored in DVD-ROM and so on.

The printing system 200 comprises, for example, a printing mechanism 100 as a print executing device, a CPU 210 as a controller for the printing mechanism 100, the non-transitory storage medium 220 such as a hard disk drive, a transitory storage medium 230 such as a hard disk, or a flash memory, an operating unit 260 such as a button, or a touch screen for receiving user operations, a display 270 such as a liquid crystal display, and a communication unit 280. The printing system 200 is connected to external devices, for example, a terminal device of a user (which is not illustrated) through the communication unit 280 so as to be communicatable with the external devices.

The transitory storage medium 230 provides a buffer area 231 in which various kinds of intermediate image data generated when the CPU 210 executes processes is temporary stored. The non-transitory storage medium 220 stores a computer program CP. In the present embodiment, the computer program CP is a control program for controlling the printing system 200. The computer program CP may be provided in a state in which the computer program CP is stored in the non-transitory storage medium 220 when the printing system 200 is shipped. Alternatively, the computer program CP may be provided in the manner of downloading from a server, or being stored in DVD-ROM and so on. The CPU 210, for example, controls the printing mechanism 100 so as to execute a printing process, which is described below, by executing the computer program CP.

The printing mechanism 100 executes printing by ejecting ink (liquid droplets) of cyan (C), magenta (M), yellow (Y), and black (K). The printing mechanism 100 comprises a printer head 110, a head driver 120, a main scanning unit 130, and a conveying unit 140.

Figure 2A:
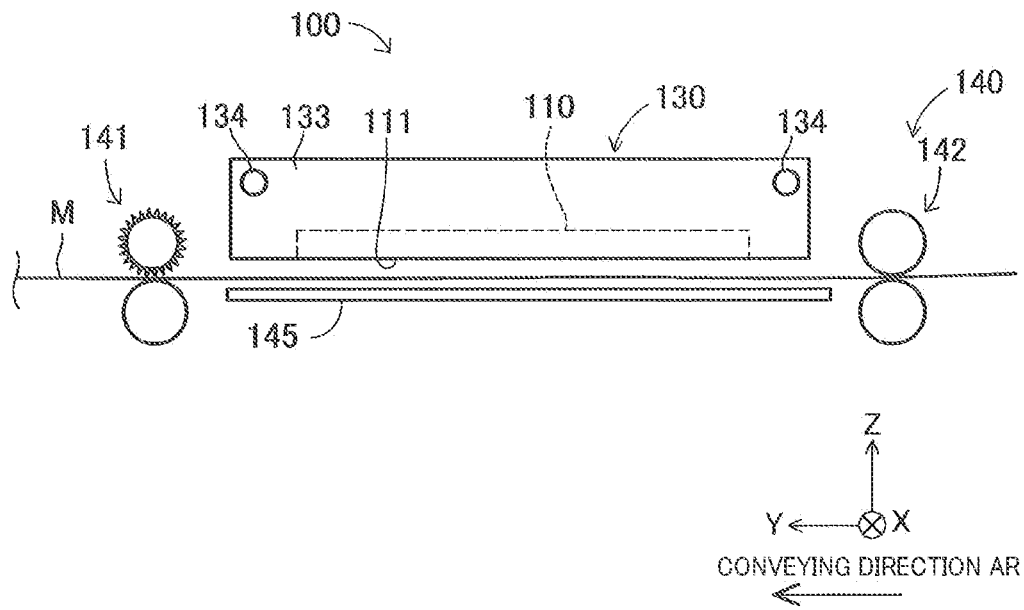
FIG. 2A is a schematic diagram illustrating the printing system.

FIG. 2A is a diagram illustrating a schematic configuration of the printing mechanism 100. As illustrated in FIG. 2A, the main scanning unit 130 includes a carriage 133 mounting the printer head 110, a slidable shaft 134 that supports the carriage 133 such that the carriage 133 can reciprocate in a main scanning direction (a X-axis direction in FIG. 2A). The main scanning unit 130 puts the carriage 133 into reciprocation movement along the slidable shaft 134 by a power of a main scanning motor, which is not illustrated. As a result of this, main scanning in which the printer head 110 is reciprocated with respect to a sheet M in the main scanning direction is executed.

The conveying unit 140 conveys the sheet M in the conveying direction (+Y orientation in FIG. 2), intersecting the main scanning direction, while supporting the sheet M. As illustrated in FIG. 2A, the conveying unit 140 comprises a platen 145, an upstream roller pair 142, a downstream roller pair 141. In the following description, an upstream side in the conveying direction (−Y orientation) will be simply referred to as "the upstream side", and a downstream side in the conveying direction (+Y orientation) will be simply referred to as "the downstream side".

The upstream roller pair 142 support the sheet M at an upstream side (−Y orientation) of the printer head 110, and the downstream roller pair 141 support the sheet M at a downstream side (+Y orientation) of the printer head 110. The platen 145 is disposed at a position between the upstream roller pair 142 and the downstream roller pair 141, and the position opposing a nozzle forming surface 111 of the printer head 110. The sheet M is conveyed by driving the downstream roller pair 141 and the upstream roller pair 142 by a conveying motor, which is not illustrated.

The head driver 120 (FIG. 1) drives the printer head 110 by supplying a driving signal to the printer head 110 in the middle of main scanning of the printer head 110 by the sheet scanning unit 130. The printer head 110 ejects ink on the sheet conveyed by the conveying unit 140 in accordance with the driving signal so as to form dots on the sheet.

Figure 2B:
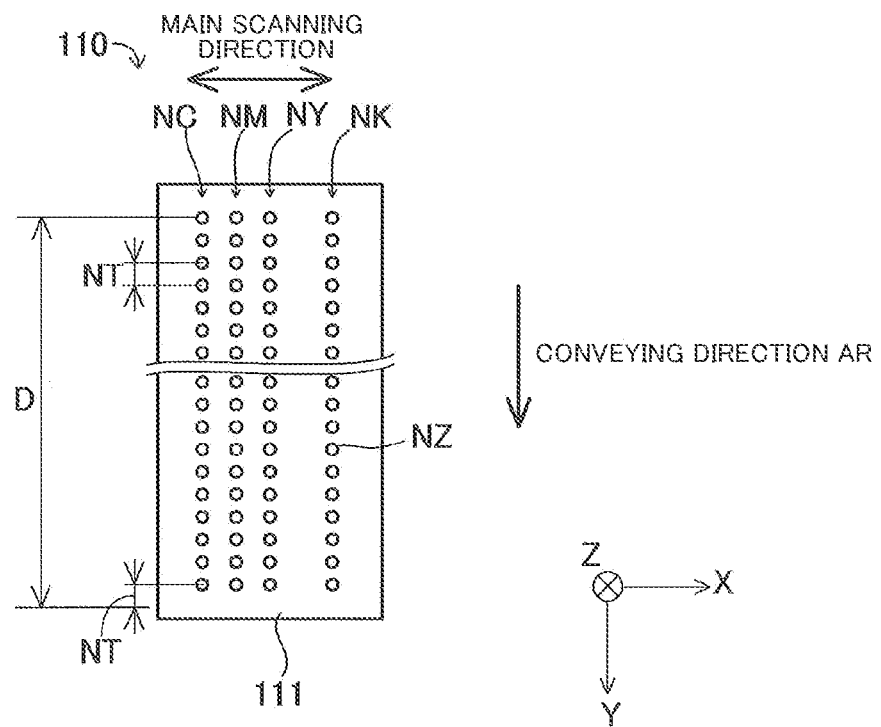
FIG. 2B is a schematic diagram illustrating a printer head.

FIG. 2B illustrates a configuration of the printer head 110 which is viewed from −Z orientation (from a lower side in FIG. 2A). As illustrated in FIG. 2B, a plurality of nozzle rows each constituted by a plurality of nozzles, which are, a nozzle row NC, a nozzle row NM, a nozzle row NY, and a nozzle row NK respectively eject ink of cyan (C), magenta (M), yellow (Y) and black (K) are formed on the nozzle forming surface 111 of the printer head 110. Each of the nozzle rows NC, NM, NY, and NK includes the plurality of nozzles NZ arranged in the conveying direction. The plurality of nozzles NZ are arranged in the conveying direction with a predetermined nozzle spacing NT such that positions of any two of the plurality of nozzles NZ in the conveying direction (+Y orientation) are different from each other. The nozzle spacing NT is a length in the conveying direction AR between two adjacent nozzles in the conveying direction of the plurality of nozzles NZ.

The CPU 210 controls the printing mechanism 100 described above to execute printing. That is, the CPU 210 executes partial printing to form dots on the sheet M in which the CPU 210 controls the printer head 110 to eject ink while controlling the main scanning unit 130 to execute main scanning, and sub canning in which the CPU 210 controls the conveying unit 140 to convey the sheet M in the conveying direction, and the CPU 210 executes the partial printing and the sub scanning alternately and a plurality of times so as to print a printing image on the sheet M.

Printing Process

The user inputs a printing instruction to the application when printing the image based on image data being processed by the application being executed in the terminal device 300. When the printing instruction is input, the application starts a printer driver. That is, the CPU 310 executes the printer driver program DP. The printer driver (i.e., the CPU 310) starts the printing process.

FIG. 3 is a flowchart of the printing process of a first embodiment. At S10, the printer driver displays a user interface screen (a UI screen) on the display 370.

FIGS. 4A and 4B each illustrates one example of the UI screen for inputting the printing instruction. A UI screen WI1 in FIG. 4A includes input elements for designating one effective selection, among a plurality of selections, corresponding to each of a plurality of setting items related to printing. Specifically, the UI screen WI1 includes a pull-down menu PM1 for inputting condition information related to printing among a plurality of selections, a plurality of radio buttons RB1-RB6, and a plurality of buttons, BTS, BT1, BT2.

The pull-down menu PM1 is an inputting element for inputting designation of a size of the sheet M as a printing medium. In the present embodiment, the user can input, as a selection, a standard sized shortened sheet such as A4, A3, an elongated sheet (for example, a sheet having a size of 297 mm×1200 mm), and a sheet having a size defined by the user. The sheet having the size defined by the user is a sheet having the size that has been registered in advance by the user. The user can register a sheet having any sizes through a UI screen WI2, which is described below (FIG. 4B), that is displayed when the buttons BTs is pushed.

The radio buttons RB1, RB2 are inputting elements for inputting an instruction of whether the sheet is printed vertically, or horizontally. Radio buttons RB3, RB4 are inputting elements for inputting designation of a color mode in printing. In the present embodiment, selection of the color mode is selected among two kinds of modes, a monochrome mode and a color mode. Radio buttons RB5, RB6 are inputting elements for inputting designation of printing mode. In the present embodiment, selection of the printing mode is selected among two kinds of modes, a normal quality mode and a high quality mode. Image quality of an image printed by the high quality mode is higher that of an image printed by the normal quality mode.

The UI screen WI2 in FIG. 4B is a screen for registering a size of the sheet M by the user. The UI screen WI2 includes two radio buttons RB7, RB8, two input fields IS1, IS2, and two buttons BT3, BT4.

The radio buttons RB7, RB8 are inputting elements for inputting designation of a unit used when inputting a size of the sheet M. In the present embodiment, selection of the unit is selected among two kinds of units, a millimeter and an inch. The input field IS1 is an inputting element for inputting a value of a width of the sheet. The input field IS2 is an inputting element for inputting a value of a height of the sheet.

In the UI screen WI2, when the OK button BT3 is pushed, a size defined by the unit selected through the radio buttons RB7, RBB, and the values input to the two input fields IS1, IS2 at that time is registered.

In the UI screen WI1, when the printing button BT1 is pushed, at S15, the printer driver obtains printing condition information indicating conditions related to printing through the UI screen WI1. Information indicating selections designated on the UI screen WI1 at a time when the printing button BT1 is pushed is obtained as the effective printing condition information corresponding to the setting items. As described above, the printing condition information includes information indicating a size of the sheet M, information indicating a printing direction of the sheet, and information indicating the printing mode.

At S20, the printer driver specifies a length B of the sheet M in the conveying direction AR based on the printing condition information. Specifically, the length B of the sheet M in the conveying direction AR is specified based on the information indicating the size of the sheet M and the information indicating the printing direction of the sheet (printing vertically, or horizontally). In a case where the printing vertically is selected as the printing direction of the sheet, a height of the sheet M is the length B of the sheet in the conveying direction AR, in a case where the printing horizontally is selected as the printing direction of the sheet, a width of the sheet M is the length B of the sheet in the conveying direction AR. In a case where the sheet M having the size of A3, A4, or the elongated sheet is designated, a value indicating the length B of the sheet in the conveying direction AR among memorized heights or widths (the unit of length is, for example, a millimeter) of each standard sized printing medium in advance is specified. In a case where the size defined by the user is designated, a value indicating the length B of the sheet in the conveying direction AR among the height and the width of the sheet registered by the user is specified.

At S25, the printer driver determines whether the specified length B of the sheet M in the conveying direction AR is greater than a reference length A. The reference length A is a length of the sheet M in the conveying direction AR corresponding to an upper limit of a length in the conveying direction AR of a printing image to be printed on the sheet M (the unit is, for example, a pixel). In the present embodiment, the upper limit is a maximum value (32767) of an integer that can be expressed by 2 bytes. The reference length A is a value in accordance with printing resolution C in the conveying direction, and each reference length A corresponding to printing resolution C is stored in advance. The printer driver determines printing resolution in the conveying direction based on the selected printing mode, and determines whether the length B of the sheet M in the conveying direction AR is greater than the reference length A corresponding to the determined printing resolution of the selected printing mode. For example, in a case where printing resolution in the conveying direction is 600 dpi, the reference length A is about 1400 mm. In the present embodiment, it is noted that the fact that the length of the sheet M in the conveying direction AR is greater than the reference length A means that a length of a printing image in the conveying direction AR is greater than the upper limit.

In a case where the length B of the sheet M in the conveying direction AR is equal to or less than the reference length A (S25:NO), at S30, the printer driver determines rasterizing conditions including resolution for rasterizing. In this case, even when the printer driver executes rasterizing by using the original printing resolution corresponding to the printing mode, there is no possibility that the number of pixels of a generated bitmap image in the conveying direction AR becomes greater than the upper limit. Accordingly, the printer driver determines the printing resolution corresponding to the printing mode as the resolution for rasterizing. That is, a resolution D for rasterizing in the conveying direction AR is determined to the printing resolution C in the conveying direction (D=C). It is noted that the rasterizing conditions include other conditions, for example, resolution for rasterizing in the main scanning direction, sizes (the numbers of pixels in the main scanning direction and the conveying direction), the number of colors (the number of levels of gray/color, and the like). These conditions are determined based on the printing condition information obtained at S15.

At S35, the printer driver causes the OS program OP to generate intermediate image data based on the determined rasterizing conditions. The intermediate image data is vector data written in rendering commands interpretable by the rasterizer. In the present embodiment, the intermediate image data is a file in EMF (Enhanced Metafile) format. Specifically, the printer driver passes the rasterizing conditions to the OS program OP, and instructs the OS program OP to generate intermediate image data. The OS program OP obtains the vector data (a set of rendering commands) indicating an image to be printed from the application, generates intermediate image data by using the vector data and the rasterizing conditions obtained from the printer driver.

At S40, the printer driver causes the rasterizer to generate bitmap data based on the intermediate image data generated by the OS program OP. The rasterizer converts the intermediate image data into bitmap data in accordance with an instruction from the printer driver. In the present embodiment, bitmap data is RGB image data in which each of pixels includes a RGB value. The RGB value is, for example, a color value of RGB color system including three component values of red, green and blue. The number of pixels in the conveying direction of the bitmap image indicated by the generated bitmap data is equal to or less than the above described upper limit.

When it is determined that the length B of the sheet M in the conveying direction AR is greater than the reference length A (S25:YES), at S45, the printer driver determines the rasterizing conditions including resolution for rasterizing. In this case, when the printer driver executes rasterizing by using the original printing resolution corresponding to the printing mode, the number of pixels of the generated bitmap image in the conveying direction becomes greater than the upper limit. Accordingly, the printer driver determines resolution for rasterizing such that the number of pixels of the generated bitmap image in the conveying direction does not become greater than the upper limit. In the present embodiment, the resolution D in the conveying direction for rasterizing is determined to a value calculated by multiplying the printing resolution C in the conveying direction by a value calculated by dividing the reference length A by the length B of the sheet M in the conveying direction AR. That is, the resolution D for rasterizing in the conveying direction is calculated by using the following equation (1).

$$D=(A/B) \times C \qquad (1)$$

As a result of this, the reduced bitmap image that is reduced in the conveying direction AR by (A/B) is generated, comparing with rasterizing by using the original printing resolution. It is noted that, in the present embodiment, resolution for rasterizing in the main scanning direction is determined such that the bitmap image is also reduced in the main scanning direction by (A/B), comparing with rasterizing by using the original printing resolution.

At S50, as similar to S35, the printer driver causes the OS program OP to generate intermediate image data based on the determined rasterizing conditions. At S55, the printer driver causes the rasterizer to generate bitmap data based on the intermediate image data generated by the OS program OP. The rasterizer converts the intermediate image data into the bitmap data (in the present embodiment, the RGB image data) in accordance with an instruction from the printer driver. A size of the bitmap image indicated by the generated bitmap data is less than that of an image to be printed. Specifically, the number of pixels of the bitmap image in each of the conveying direction and the main scanning direction is calculated by multiplying the number of pixels of the image to be printed in each of the conveying direction and the main scanning direction by (A/B). The number of pixels in the conveying direction of the reduced bitmap image is identical with the upper limit described above.

At S60, the printer driver determines a magnification factor E of the generated bitmap data. The magnification factor E is determined such that a size of the enlarged bitmap data is identical with a size of the image to be printed. In the present embodiment, the magnification factor E is determined to a value calculated by dividing the length B of the sheet M in the conveying direction AR by the reference length A. That is, the magnification factor E is calculated by using the following equation (2).

$$E=(B/A) \qquad (2)$$

At S60, the printer driver generates enlarged bitmap data that is generated by enlarging the original bitmap data by using the determined magnification factor E. A size of the enlarged bitmap image indicated by the enlarged bitmap data is a size of the image to be printed. A magnifying process is executed by using interpolation operation, for example, Bicubic interpolation, Bilinear interpolation, and so on.

At S70, the printer driver generates print data indicating the printing image by using the bitmap data generated at S40, or the enlarged bitmap data generated at S65. Specifically, the printer driver executes a color conversion process with respect to the bitmap data (the RGB image data). The color conversion process is a process of converting RGB values of a plurality of pixels included in the RGB image data into CMYK values. The CMYK values are color values of CMYK color system including component values corresponding to ink used in printing (in the present embodiment, component values of C, M, Y, K). The color conversion process is executed by referring a well-known look-up table establishing a relationship between, for example, the RGB value and the CMYK value. The printer driver generates print data (which may be referred to as dot data) by executing a halftone process with respect to the image data to which the color conversion process has been processed.

The print data is data representing a dot-forming state of each of the color components of CMYK for each of the pixels. A value of each of the pixels of the print data, for example, represents the dot-forming state such as two levels of "no dots" and "with dots", or four levels of "no dots", "small dots", "medium dots", and "large dots". The halftone process is executed by using a well-known method, such as a dither method and an error diffusion method.

At S75, the printer driver causes the printing system 200 to print by using the print data. For example, the printer driver generates a plurality of pieces of partial print data by dividing the print data such that the printer driver causes the printing system 200 to execute the partial printing a plurality of times. The printer driver transmits, to the printing system 200, control data indicating a conveyance amount of the sheet M, a speed of main scanning, and so on in addition to the partial print data. The printing system 200 prints the image on the sheet M in accordance with the partial print data and the control data.

According to the above described present embodiment, the printer driver program DP causes the CPU 310 to executes a function of determining the rasterizing conditions (the process executed at S45 in FIG. 3), a function of obtaining the bitmap data satisfying the rasterizing conditions by using the rasterizer (the process executed at S50, S55 in FIG. 3), a function of determining a magnifying condition for magnifying the bitmap data based on the printing condition information (the process executed at S60 in FIG. 3), a function of obtaining the enlarged bitmap data by using the magnifying condition (the process executed at S65 in FIG. 3), and a function of generating the print data by using the enlarged bitmap data (the process executed at S70 in FIG. 3) such that the number of pixels of the bitmap image in the conveying direction becomes equal to or less than the upper limit.

For example, there is a possibility of being unable to appropriately generate the bitmap data of the bitmap image, the number of pixels in the conveying direction of which becomes greater than the upper limit due to specifications of any of the application program AP, the OS program OP, and the rasterizing program RP, or any combination of the application program AP, the OS program OP, and the rasterizing program RP. In printing using the elongated sheet, there is a case in which the number of pixels in the conveying direction corresponding to the elongated sheet becomes greater than the upper limit. In this case, when the rasterizing program RP generates the bitmap data of the bitmap image having pixels corresponding to the elongated sheet, there is a possibility of causing a problem such as a chip in a part of the bitmap image indicated by the generated bitmap data. According to the present embodiment, since the rasterizing conditions are determined such that the number of pixels of the bitmap image in the conveying direction becomes equal to or less than the upper limit, the number of pixels in the conveying direction of the bitmap data generated by the rasterizing program RP is suppressed equal to or less than the upper limit. Accordingly, it is possible to prevent occurrence of the problem. Moreover, since the print data is generated by using the enlarged bitmap data generated by magnifying the bitmap data, it is possible to appropriately generate the print data based on the vector data generated by the application.

Moreover, according to the present embodiment, the printer driver, at S45 in FIG. 3, determines a generating condition such that the number of pixels of the bitmap image in the conveying direction is identical with the upper limit. As a result of this, at S55 in FIG. 3, it is possible to prevent from generating an excessive small sized bitmap data. When the excessive small sized bitmap data is generated, image quality of an image indicated by the enlarged bitmap data reduces, as a result, image quality of the image to be printed may reduce. According to the present embodiment, it is possible to prevent reduction of image quality of the image printed by using the print data.

Moreover, according to the present embodiment, the printing condition information obtained at S15 includes information indicating the length of the sheet M in the conveying direction AR (FIG. 4A). When the length in the conveying direction AR specified by length information is greater than the reference length A (S25 in FIG. 3:YES), the printer driver determines the rasterizing conditions such that the number of pixels of the bitmap image in the conveying direction is equal to or less than the upper limit at S45 in FIG. 3. Then, the printer driver determines the magnifying condition at S60 in FIG. 3 such that the enlarged bitmap data, the number of pixels in the conveying direction of which corresponds to the length in the conveying direction AR of the printing image to be printed. As a result of this, it is possible to appropriately generate the print data based on the vector data generated by the application even when the length of the sheet M in the conveying direction AR is comparatively long such as printing on the elongated sheet.

Moreover, the rasterizing conditions determined at S45 in FIG. 3 includes the resolution D in the conveying direction for generating the bitmap data, and the magnifying condition determined at S60 in FIG. 3 includes the magnification factor E for magnifying the bitmap data. The resolution D and the magnification factor E are calculated by the equations of $D=(A/B) \times C$ and $E=(B/A)$, when A represents the reference length corresponding to the upper limit, B represents the length of the sheet M in the conveying direction AR, and C represents the printing resolution of the printing image in the conveying direction. As a result of this, it is possible to appropriately determine the resolution D and the magnification factor E.

Moreover, according to the present embodiment, the printer driver causes the rasterizing program RP that is an external conversion program configured to convert the vector data into the bitmap data to generate the bitmap data, and obtains the bitmap data at S50 in FIG. 3. As a result of this, it is possible to appropriately generate the print data based on the vector data generated by the application. Moreover, since there is no need to incorporate a rasterizing function in the printer driver program DP, it is possible to reduce a length of time required for developing the printer driver program DP.

Moreover, according to the present embodiment, the printer driver generates the enlarged bitmap data by executing, by itself, the magnifying process of magnifying the bitmap data generated the rasterizing program RP, and obtains the enlarged bitmap data. As a result of this, it is possible to appropriately generate the enlarged bitmap data indicating the bitmap image having a size that cannot be generated by the rasterizing program RP only. Accordingly, it is possible to appropriately generate the print data based on the vector data generated by the application.

As understood by the above description, the bitmap data generated at S55 in FIG. 3 of the present embodiment is an example of a first bitmap data, and the enlarged bitmap data generated at S65 in FIG. 3 is an example of a second bitmap data. Also, in the conveying direction of the present embodiment is an example of a particular direction, and the upper limit of the number of pixels in the conveying direction is an example of a particular number.

Second Embodiment

Figure 5:
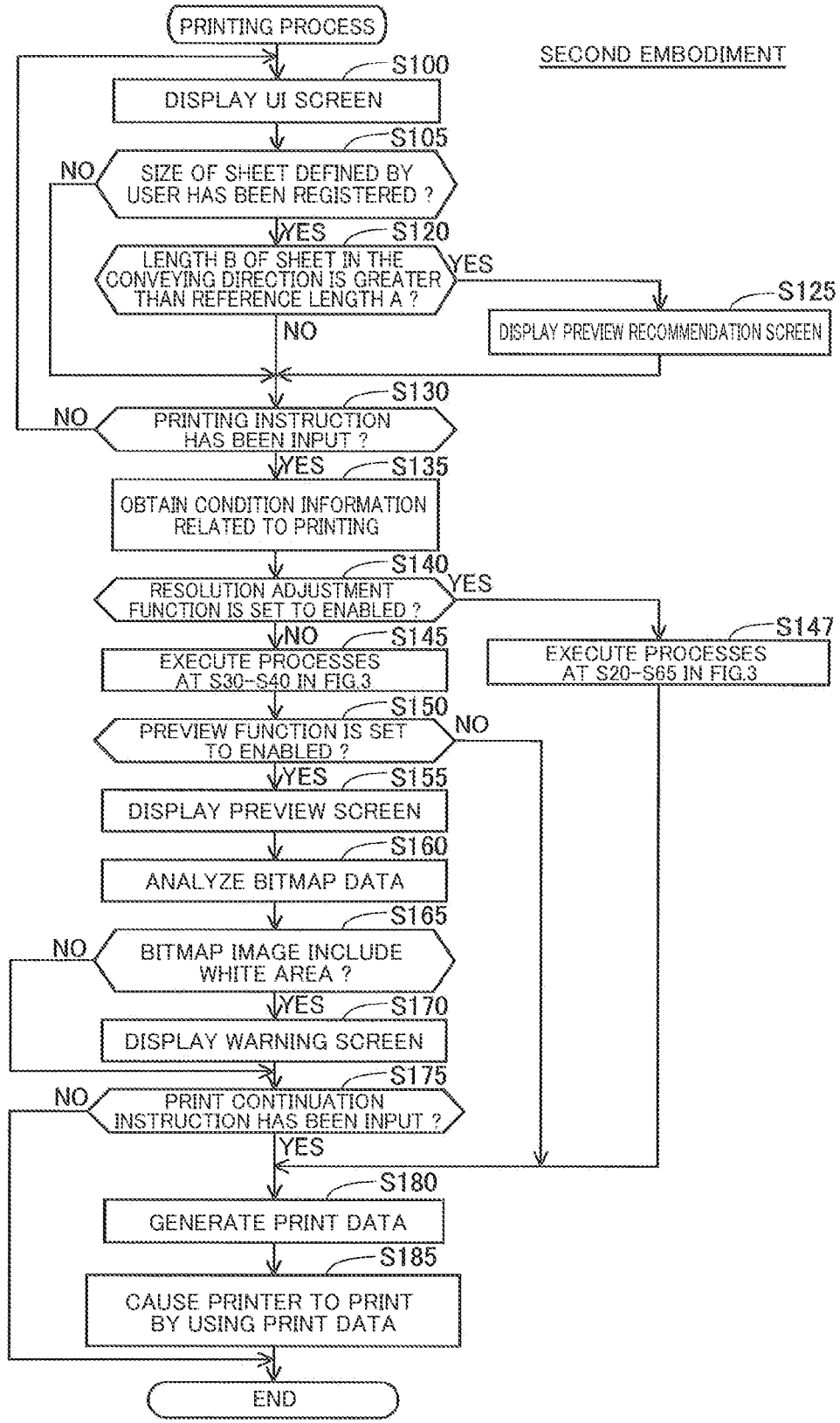
FIG. 5 is a flowchart of a printing process of a second embodiment.

FIG. 5 is a flowchart of a printing process of a second embodiment. FIGS. 6A, 6B and FIGS. 7A, 7B are diagrams illustrating examples UI screens of the second embodiment. Details are described below, however, the printer driver can obtain various instructions input by the user through the UI screens. In the second embodiment, instead of the printing process in FIG. 3, the printing process in FIG. 5 is executed. Other configurations in the second embodiment (for example, configurations in FIG. 1) coincide with the first embodiment. The printing process is executed by the CPU 310 of the terminal device 300 as similar to the first embodiment.

Figure 6A:
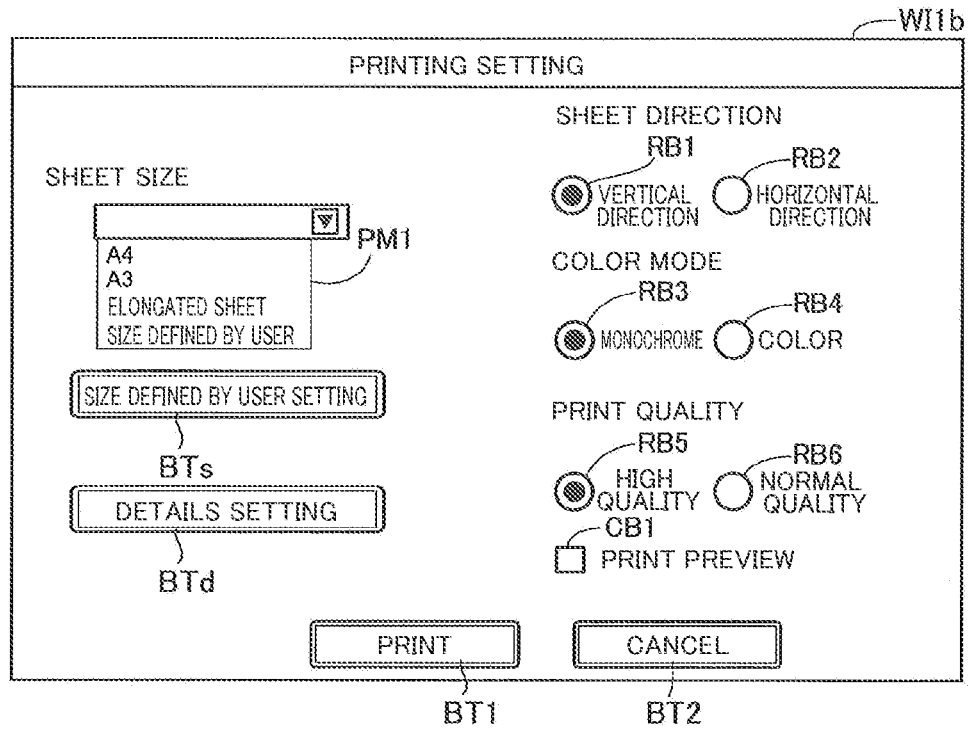
FIG. 6A illustrates one example of a UI screen for printing settings of the second embodiment.

At S100, the printer driver displays the UI screen on the display 370. Specifically, first, a main screen WI1b in FIG. 6A is displayed on the display 370. The main screen WI1b, as similar to the UI screen WI1 in FIG. 4A, includes the pull-down menu PM1 that is an inputting element for inputting condition information related to printing among a plurality of selections, the plurality of radio buttons RB1-RB6, and the plurality of buttons BTs, BT1, BT2. When the buttons BTs is pushed, as similar to the first embodiment, the UI screen WI2 is FIG. 4B is displayed. As similar to the first embodiment, the user can register a sheet having any sizes as the sheet having the size defined by the user through the UI screen WI2 (FIG. 4B) that is displayed when the button BTs is pushed.

The main screen WI1b in FIG. 6A further includes a details setting button BTd and a checkbox CB1. When the details setting button BTd is pushed, the printer driver displays a details setting screen WI3b in FIG. 6B on the display 370. The checkbox CB1 is an inputting element for inputting an instruction of whether a function (which is also referred to as a preview function) for displaying a preview screen WI5b (FIG. 7B) that is a UI screen for displaying a print preview, which is described below and displayed before actual printing, is set to enable or disable.

Figure 6B:
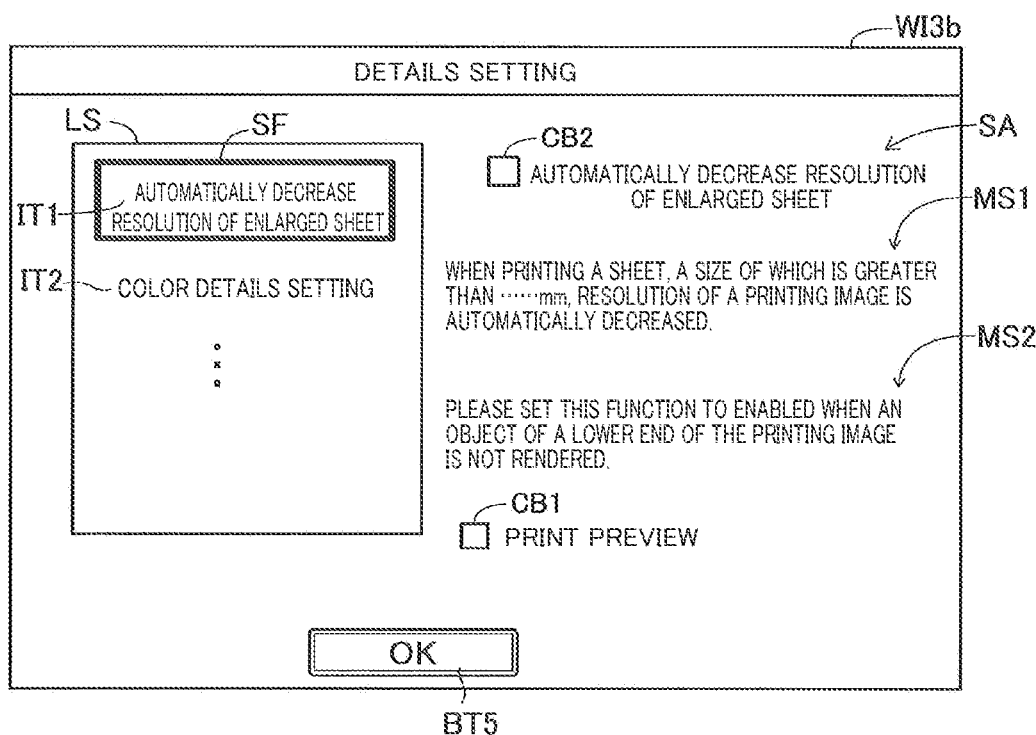
FIG. 6B illustrates one example of a UI screen for detail settings of the second embodiment.

The details setting screen WI3b in FIG. 6B is a UI screen for inputting detailed settings related to printing. The details setting screen WI3b includes an item list LS, a details setting area SA and an OK button BTS. The item list LS is a list including a plurality of setting items (for example, item lists IT1, IT2 in FIG. 6B). In the details setting area SA, inputting elements for inputting detailed settings and messages with respect to setting items set by using a selection field SF in the item list LS are displayed.

The setting item IT1 is an item for setting whether a resolution adjustment function for adjusting resolution is set to enabled or disabled. The resolution adjustment function is a function of executing S20-S65 in FIG. 3 described in the first embodiment when the bitmap data is generated.

That is, in a case where the resolution adjustment function is set to enabled, at S45 in FIG. 3, the rasterizing conditions including the resolution D in the conveying direction for rasterizing are determined such that the number of pixels of the bitmap image in the conveying direction does not become greater than the upper limit, when the length B of the sheet M in the conveying direction AR is greater than the reference length A (S25 in FIG. 3: YES). Then, the bitmap data indicating an image smaller than the image to be printed by a rasterizing process based on the rasterizing conditions is generated at S50, S55 in FIG. 3, and the bitmap data indicating a size of the bitmap image to be printed by magnifying the bitmap data in accordance with the magnification factor E is generated at S60, S65 in FIG. 3.

In a case where the resolution adjustment function is set to disabled, the bitmap data is generated by the processes in S30-S40 in FIG. 3 even when the length B of the sheet M in the conveying direction AR is greater than the reference length A. Accordingly, in the case where the resolution adjustment function is set to disabled, there is a possibility that the number of pixels in the conveying direction of the bitmap image indicated by the bitmap data generated by the rasterizing process becomes greater than the upper limit. Accordingly, in the case where the resolution adjustment function is set to disabled, there is a possibility of causing a problem such as a chip in a part of the bitmap image indicated by the generated bitmap data when the length B of the sheet M in the conveying direction AR is greater than the reference length A, according to the application.

FIG. 6B illustrates a state in which a setting item IT1 is selected in the item list LS. In this state, the details setting area SA includes the checkboxes CB1, CB2 and the messages MS1, MS2. The checkbox CB2 is an inputting element for inputting an instruction of whether the resolution adjustment function is set to enabled or disabled. The checkbox CB1 is an inputting element for inputting an instruction of whether the preview function is set to enabled or disabled, and the inputting element which coincides with the checkbox CB1 included in the main screen WI1b. The message MS1 is a message for explaining the resolution adjustment function. The message MS2 is a message for indicating that enabling the resolution adjustment function can solve the problem such as the chip in the part of the bitmap image.

When the OK button BT5 is pushed in the details setting screen WI3b, the printer driver sets each of the preview function and the resolution adjustment function to enabled or disabled in accordance with an input state of the checkboxes CB1, CB2 in the details setting area SA at that time. The printer driver further dismisses the details setting screen WI3b, and returns the display 370 to a state in which the main screen WI1b is displayed.

At S105, the printer driver determines whether the sheet having the size defined by the user is newly registered through the UI screen WI2. For example, when numerical values are input to the input fields IS1, IS2 in the UI screen WI2 (FIG. 4B) and the OK button BT3 in the UI screen WI2 is pushed, it is determined that the sheet having the size defined by the user is registered. When it is determined that the sheet having the size defined by the user is not newly registered (S105:NO), the flow goes to S130.

When it is determined that the sheet having the size defined by the user is newly registered (S105:YES), at S120, the printer driver determines whether the length B in the conveying direction AR of the registered sheet having the size defined by the user is greater than the reference length A. As similar to the first embodiment, the reference length A is a length of the sheet M in the conveying direction AR corresponding to an upper limit of a length in the conveying direction AR of a printing image to be printed on the sheet M (the unit is, for example, a pixel). When the length B in the conveying direction AR of the sheet having the size defined by the user is equal to or less than the reference length A (S120:NO), the flow goes to S130.

Figure 7A:
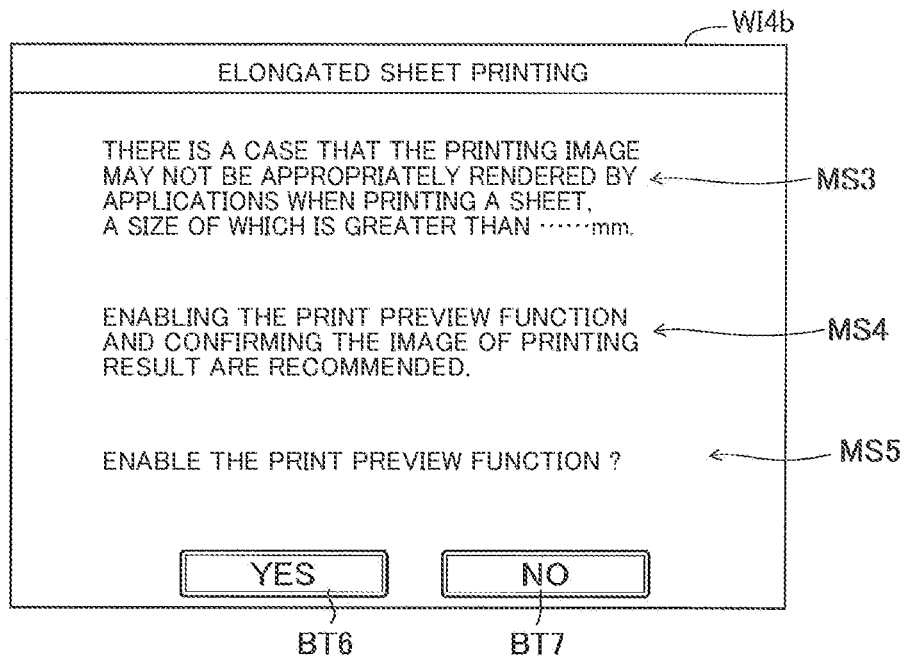
FIG. 7A illustrates one example of a UI screen for an elongated sheet printing of the second embodiment.

When the length B in the conveying direction AR of the sheet having the size defined by the user is greater than the reference length A (S120:YES), at S125, the printer driver displays a preview recommendation screen WI4B (FIG. 7A) on the display 370. The preview recommendation screen WI4b in FIG. 7A is a UI screen for recommending the user to enable the preview function. The preview recommendation screen WI4b includes, for example, messages MS3-

MS5, a YES button BT6, and a NO button BT7. The message MS3 is a message for warning of a possibility of occurrence of a problem in the image to be printed when the length of the sheet M B in the conveying direction AR is greater than the reference length A. The message MS4 is a message for recommending the user to check the image to be printed before printing by enabling the preview function. The message MS5 is a message for confirming whether the preview function is set to enabled or disabled.

When the YES button BT6 is pushed in the preview recommendation screen WI4b, the printer driver sets the preview function to enabled. When the NO button BT7 is pushed in the preview recommendation screen WI4b, the printer driver sets the preview function to disabled.

At S130, the printer driver determines whether the printing instruction is input. For example, when the printing button BT1 is pushed in the main screen WI1b, it is determined that the printing instruction is input. When the printing instruction is not input (S130:NO), the flow goes to S100, and the printer driver continues to display the UI screen such as the main screen WI1b. When the printing instruction is input (S130:YES), the flow goes to S135.

At S135, as similar to S15 in FIG. 3, the printer driver obtains the printing condition information indicating conditions related to printing through the UI screens such as the main screen WI1b.

At S140, the printer driver determines whether the resolution adjustment function is set to enabled or disabled. When the resolution adjustment function is set to enabled (S140:YES), at S147, the printer driver obtains the bitmap data based on the vector data generated by the application by executing S20-S65 in FIG. 3. That is, in this case, as described above, when the length B of the sheet M in the conveying direction AR is greater than the reference length A (S25 in FIG. 3:YES), the bitmap data is generated by processes of S45-S65 in FIG. 3, and when the length B of the sheet M in the conveying direction AR is equal to or less than the reference length A (S25 in FIG. 3:NO), the bitmap data is generated by processes of S30-S40 in FIG. 3. When the bitmap data is generated, the flow goes to S180.

When the resolution adjustment function is set to disabled (S140:NO), at S145, the printer driver obtains the bitmap data based on the vector data generated by the application by executing S30-S40 in FIG. 3. That is, in this case, as described above, even when the length B of the sheet M in the conveying direction AR is greater than the reference length A, or equal to or less than the reference length A, the bitmap data is generated by processes of S30-S40 in FIG. 3.

Figure 7B:
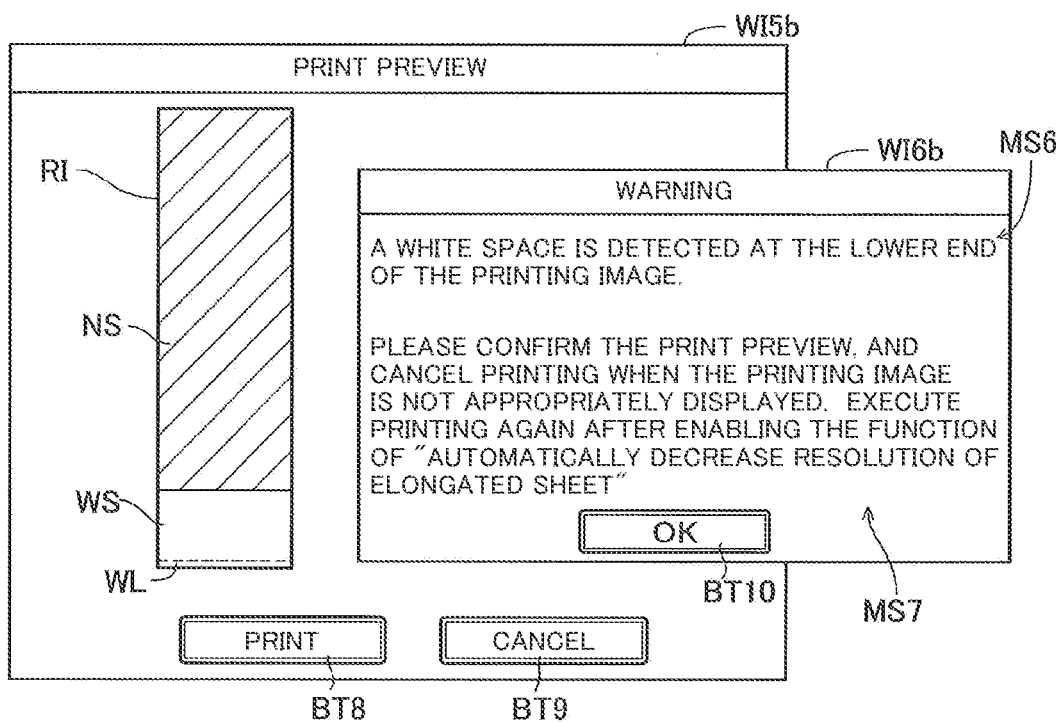
FIG. 7B illustrates one example of a UI screen for displaying a warning message of the second embodiment.

At S150, the printer driver determines whether the preview function is set to enabled or disabled. When the preview function is set to disabled (S150:NO), the flow goes to S180. When the preview function is enabled (S150:YES), at S155, the printer driver displays a preview screen WI5b in FIG. 7B on the display 370. It is noted that a warning screen WI6b in FIG. 7B is not displayed at this time point. The preview screen WI5b in FIG. 7B includes a bitmap image RI as a preview image, a printing button BTB, and a cancel button BT9. The bitmap image RI is a screen displayed by the bitmap data obtained at S145. The bitmap image RI in FIG. 7B includes a normal area NS and a white color area WS. The normal area NS is a hatched area in FIG. 7B, and an area including objects such as letters, pictures, and graphics. The white color area WS is a not-hatched area in FIG. 7B, and a white monochrome area (which may be referred to as white space). The white color area WS is an area appears in the case where the chip in the image occurs due to a problem of the rasterizing process, and does not appear in a case where the rasterizing process does not have the problem.

At S160, the printer driver analyzes the bitmap data. For example, the printer driver searches a white raster line WL from a first end (a lower end in FIG. 7B) of the bitmap image RI in the conveying direction when printing to a second end of the bitmap image RI in the conveying direction. The white raster line WL is a raster line extending from one end to the other end of the bitmap image RI in a direction orthogonal to the conveying direction when printing (a left and right direction in FIG. 7B), and is the raster line L constituted by only white pixels. In the bitmap image RI in FIG. 7B, only one white raster line WL positioned at the first end (the lower end) of the bitmap image RI is illustrated. The white color area WS is an area constituted by a plurality of white raster line WL arranged in the conveying direction.

At S165, the printer driver determines whether the bitmap image RI includes the white color area WS based on a result of analysis executed at S160. The printer driver determines that the bitmap image RI includes the white color area WS when a predetermined number or more of the white raster lines WL are detected on the lower end of the bitmap image RI. The printer driver determines that the bitmap image RI does not includes the white color area WS when the predetermined number or more of the white raster lines WL are not detected on the lower end of the bitmap image RI.

When the bitmap image RI includes the white color area WS (S165:YES), At S170, the printer driver displays the warning screen WI6b in FIG. 7B on the display 370. When the bitmap image RI does not includes the white color area WS (S165:NO), S170 is skipped. That is, in this case, the warning screen WI6b is not displayed. The warning screen WI6b in FIG. 7B is displayed together with, for example, the preview screen WI5b. The warning screen WI6b in FIG. 7B includes messages MS6, MS7 and an OK button BT10.

The message MS6 is a message for indicating that the white color area WS is detected on the lower end of the bitmap image RI. The message MS7 is a message for prompting the user to check the bitmap image RI in the preview screen WI5b, and to print again with the resolution adjustment function which is set to enabled when the bitmap image RI includes the problem. When the OK button BT 10 is pushed in the warning screen WI6b, the printer driver dismisses the warning screen WI6b from the display 370.

At S175, the printer driver determines whether a print continuation instruction or a print interruption instruction is input. When the printing button BT8 is pushed in the preview screen WI5b, it is determined that the print continuation instruction is input. When the cancel button BT9 is pushed in the preview screen WI5b, it is determined that the print interruption instruction is input.

When the print continuation instruction is input (S175: YES), at S180, the printer driver generates the print data indicating the printing image by using the bitmap data generated at S145 or S147. A generating process of the print data includes, for example, the color conversion process and the halftone process, as similar to S70 in FIG. 3.

At S185, the printer driver causes the printing system 200 to execute printing by using the print data, as similar to S75 in FIG. 3. Specifically, the printer driver transmits, to the printing system 200, control data in addition to partial print data for causing the printing system 200 to execute the partial printing a plurality of times, and ends the printing process.

When the print interruption instruction is input (S175: NO), the printer driver ends the printing process without executing S180,S185.

When the printing process ends, for example, the terminal device 300 returns to a state in which the application is started and the printer driver is not started. When the printing process ends without executing printing, the user, for example, can start the printer driver again by inputting the printing instruction to the application. Then, the user, for example, can cause the printer driver to execute printing again by enabling the resolution adjustment function.

According to the second embodiment described above, the printer driver can obtain two kinds of the bitmap data, the generating condition of which are different from each other based on whether the resolution adjustment function is set to enabled or disabled. For example, when the length B of the sheet M in the conveying direction AR is greater than the reference length A, and the resolution adjustment function is set to enabled, at S147 in FIG. 5, the bitmap data is obtained by S45-S55 in FIG. 3. When the resolution adjustment function is set to disabled, at S145 in FIG. 5, the bitmap data is obtained by S30-S40 in FIG. 3. The bitmap data obtained when the resolution adjustment function is set to disabled has resolution higher than (in other words, having more pixels) that of the bitmap data obtained when the resolution adjustment function is set to enabled, and the magnifying process (s60, S65 in FIG. 3) is not required. As a result of this, there is a case in which a different appearance occurs between a case in which the resolution adjustment function is set to enabled and a case in which the resolution adjustment function is set to disabled. Moreover, there is a case in which the problem such as the chip in the image does not occur by the application or the rasterizer, even in a case where the resolution adjustment function is set to disabled. For this reason, it is preferable that a determination of whether the resolution adjustment function is set to enabled or disabled depends on an intention of the user. According to the present embodiment, at S100 in FIG. 5, the printer driver obtains an instruction from the user whether the resolution adjustment function is set to enabled or disabled by displaying the details setting screen WI3b in FIG. 6B. Then, at S140, S145, S147 in FIG. 5, the printer driver generates the print data by obtaining one of two kinds of the bitmap data, the generating condition of which are different from each other in accordance with the obtained instruction. It is possible to appropriately generate the print data based on the vector data generated by the application in accordance with the instruction of the user.

Moreover, according to the present embodiment, when the length B in the conveying direction AR of the sheet M designated through the UI screen WI2 in FIG. 4B is greater than the reference length A (S120 in FIG. 5:YES), at S125 in FIG. 5, the printer driver obtains an instruction of whether the preview function is set to enabled or disabled, in other words, an instruction of whether the preview screen WI5b in FIG. 7B is displayed before printing, by displaying the preview recommendation screen WI4b in FIG. 7A. When the length B of the sheet M in the conveying direction AR is greater than the reference length A, as described above, there is a case in which the problem such as the chip in the bitmap image occurs. In this case, since the printer driver obtains the instruction of whether the preview function is set to enabled or disabled, it is possible to prompt advance confirmation of the user in the case where there is a possibility of the occurrence of the problem such as the chip in the bitmap image. Accordingly, it is possible to appropriately prevent the possibility that the image in which the problem such as the chip occurs is actually printed.

Moreover, in the present embodiment, when the resolution adjustment function is set to disabled (S140 in FIG. 5:NO), there is a possibility that the number of pixels in the particular direction AR of the bitmap image generated by the rasterizer becomes greater than the particular number. In this case, at S160. S165 in FIG. 5, the printer driver determines whether there is the white color area WS is on the lower end of the bitmap image RI in the particular direction AR, the length of which in the particular direction AR is greater than the predetermined length by analyzing the bitmap data. At S170 in FIG. 5, the printer driver displays the warning screen WI6b including the message MS6 for warning the user, when the white color area WS, the length of which in the particular direction AR is greater than the predetermined length, is in the bitmap image RI (S165 in FIG. 5:YES). When the white color area WS, the length of which in the particular direction AR is greater than the predetermined length, is in the bitmap image RI, there is a strong possibility that the problem such as the chip in the image occurs. According to the present embodiment, it is possible to appropriately display the message MS6 for warning when there is the strong possibility that the problem such as the chip in the image occurs.

Moreover, as illustrated in FIG. 7B, the warning screen WI6b is displayed together with the preview screen WI5b. As a result of this, the user can check the bitmap image RI in the preview screen WI5b after watching the message MS6 for warning. In a case where the user confirms the occurrence of the problem such as the chip in the bitmap image RI, the user can handle the problem, for example, interrupting the printing. Accordingly, it is possible to appropriately prevent the possibility that the image in which the problem such as the chip occurs is printed by mistake.

Moreover, the details setting screen WI3b of the present embodiment includes the checkbox CB1 for inputting the instruction of whether the preview function is set to enabled or disabled in addition to the checkbox CB2 for inputting the instruction of whether the resolution adjustment function is set to enabled or disabled. In a case where the resolution adjustment function is set to disabled, since there is a possibility that the problem such as the chip in the image occurs, as described above, it is preferable that the preview function is set to enabled. According to the present embodiment, since the user can input the instruction for enabling the preview function in addition to the instruction for disabling the resolution adjustment function through the one details setting screen WI3b, it is possible to improve convenience of the user.

As understood by the above description, the bitmap data generated at S55 in FIG. 3 included in S147 FIG. 5 of the present embodiment is an example of a first bitmap data, and the enlarged bitmap data generated at S65 in FIG. 3 included in S147 in FIG. 5 is an example of a second bitmap data. Moreover, the bitmap data generated at S40 in FIG. 3 included in S145 in FIG. 5 is an example of a third bitmap data. The details setting screen WI3b of the present embodiment is an example of a first screen, the UI screen WI2 is an example of a second screen, and the preview screen WI5b is an example of a third screen. The preview recommendation screen WI4b of the present embodiment is an example of a fourth screen.

Third Embodiment

Figure 8:
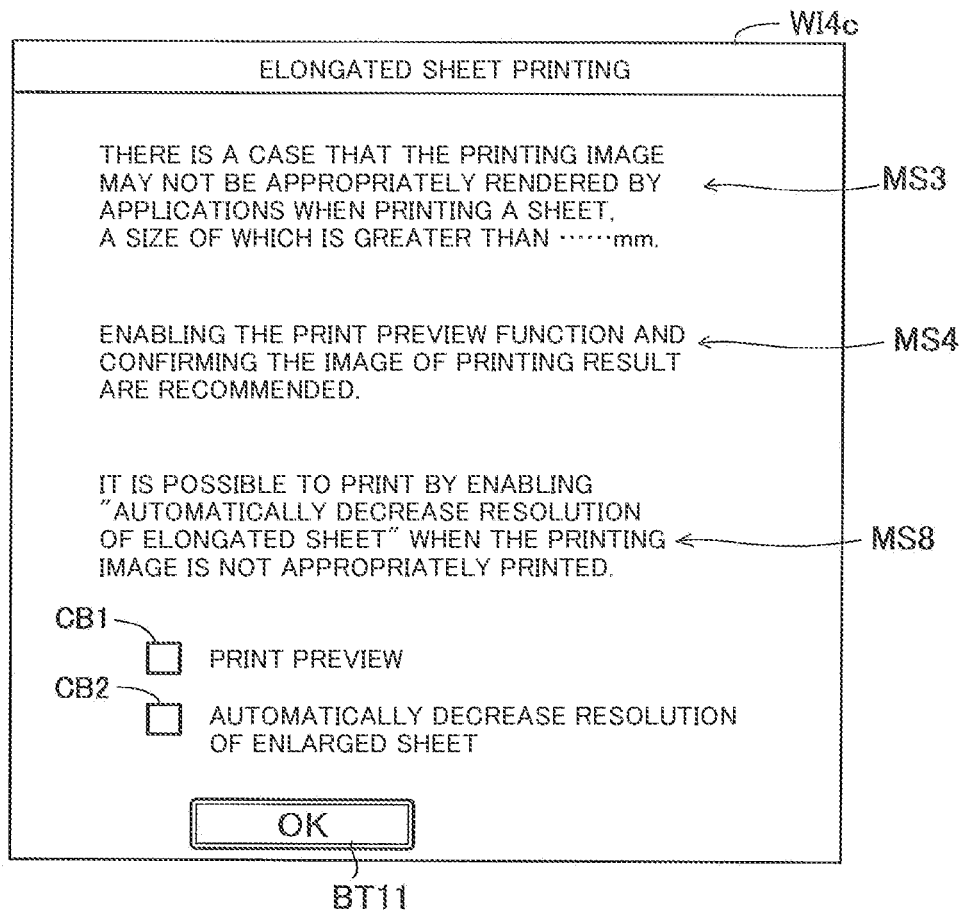
FIG. 8 illustrates one example of a preview recommendation screen of a third embodiment.

FIG. 8 illustrates an example of a preview recommendation screen WI4c of a third embodiment. In the third embodiment, instead of the preview recommendation screen WI4b in FIG. 7A, displaying the preview recommendation screen WI4c in FIG. 8 at S125 in FIG. 5 is different from the second embodiment. Other configurations in the third embodiment coincide with the first embodiment.

The preview recommendation screen WI4c in FIG. 8 includes the messages MS3, MS4, MS8, the checkboxs CB1, CB2, and an OK button BT11. The messages MS3, MS4 in FIG. 8 coincide with the same referenced messages MS3, MS4 included in the preview recommendation screen WI4b in FIG. 7A. The message MS8 is a message for indicating that enabling the resolution adjustment function can solve the problem such as the chip in the part of the bitmap image.

The checkbox CB1 is an inputting element for inputting an instruction of whether the preview function is set to enabled or disabled. The checkbox CB2 is an inputting element for inputting an instruction of whether the resolution adjustment function is set to enabled or disabled. When the OK button BT11 is pushed in the preview recommendation screen WI4c, each of the preview function and the resolution adjustment function is set to enabled or disabled in accordance with an input state of the checkboxs CB1, CB2 at that time.

According to the third embodiment, it is possible to allow the user to input the instruction of whether the preview function is set to enabled or disabled and allow the user to input the instruction of whether the resolution adjustment function is set to enabled or disabled through the preview recommendation screen WI4c. As a result of this, it is possible to further improve convenience of the user.

That is, according to the present embodiment, when the length in the conveying direction AR of the sheet M designated through the UI screen WI2 (FIG. 4B) is greater than the reference length A (S120 in FIG. 5:YES), the printer driver can obtain the instruction of whether the resolution adjustment function is set to enabled or disabled through the preview recommendation screen WI4c at S125 in FIG. 5. As described above, when the length of the sheet M in the conveying direction AR is greater than the reference length A, there is a possibility that the problem such as the chip in the bitmap image occurs in a case where the resolution adjustment function is set to disabled. In this case, since the preview recommendation screen WI4c which allows the user to input the instruction for enabling the resolution adjustment function is displayed, the user can input the instruction for enabling the resolution adjustment function so as to solve the problem such as the chip in the image at the timing of a possibility of occurrence of the problem such as the chip in the image. Accordingly, the printer driver can obtain the instruction from the user at the appropriate timing, and it is possible to appropriately prevent the occurrence of the problem such as the chip in the image.

First Modification

In each of the above described embodiments, the length of the sheet M in the conveying direction AR is specified at S20 in FIG. 3. Instead of this, the length of the printing image in the conveying direction AR may be specified at S20. In this case, for example, a value calculated by subtracting a length of a margin of the sheet from the length of the sheet M in the conveying direction AR is specified as the length of the printing image in the conveying direction AR. A unit of the length of the printing image in the conveying direction AR may be a millimeter or a pixel. In this case, the reference length A used at S25, S45, and S60 is the upper limit of the length of the printing image in the conveying direction AR.

Instead of the length of the sheet M in the conveying direction AR, even in a case where the length of the printing image in the conveying direction AR is used, the resolution D for rasterizing and the magnification factor E are calculated by the equations of $D=(A/B)\times C$ and $E=(B/A)$, when B represents the length of the printing image in the conveying direction AR, the reference length A represents the upper limit of the length of the printing image in the conveying direction AR, and C represents the printing resolution of the printing image in the conveying direction.

In each of the above described embodiments, the rasterizing conditions is determined at S45 such that the number of pixels in the conveying direction of the bitmap image generated at S55 in FIG. 3 is identical with the upper limit. Instead of this, the rasterizing conditions may be determined at S45 such that the number of pixels in the conveying direction of the bitmap image generated at S55 becomes just less than the upper limit.

In each of the above described embodiments, when the length of the printing image in the conveying direction AR is greater than the reference length A based on the printing condition information, the resolution D for rasterizing and the magnification factor E are determined by using the equations of $D=(A/B)\times C$ and $E=(B/A)$. Instead of this, for example, regardless of the length of the printing image in the conveying direction, the resolution D for rasterizing may be determined such that bitmap data, a length of which is half of the length of the printing image in the conveying direction AR, is generated, and the magnification factor E may be two. That is, the resolution D for rasterizing and the magnification factor E may be determined by the following equations, $D=C/2$, and $E=2$.

In each of the above described embodiments, the rasterizing conditions includes the resolution D for rasterizing. Not limited to this, the rasterizing conditions may be appropriately changed in accordance with specifications of the rasterizing program RP. For example, the rasterizing conditions may only designate the number of pixels in a height direction of the bitmap data and a horizontal direction of the bitmap data.

In each of the above described embodiments, the printer driver causes the OS program OP to generate the intermediate image data at S50 in FIG. 3, and causes the rasterizer to generate the bitmap data based on the intermediate image data at S55. Instead of this, the printer driver may generate the bitmap data by analyzing, by itself, the vector data and executing the rasterizing process. Then, at S65, the printer driver may magnify the bitmap data generated by the printer driver.

In the above described embodiment, at S65 in FIG. 3, the printer driver generates the enlarged bitmap data by executing, by itself, the magnifying process with respect to the bitmap data generated by the rasterizer. Instead of this, the printer driver may obtain the enlarged bitmap data by causing another program that is different from the printer driver (for example, an image processing application) to execute the magnifying process.

Instead of the sheet M, other medium, for example, films for OHP, CD-ROM, and, DVD-ROM may be applied as printing medium.

In each of the above described embodiments, the printing system 200 comprises the ink-jet type printing mechanism 100. Instead of this, the printing system 200 may comprise an electrophotography type printing mechanism 100 configured to form images by using toner.

In each of the above described embodiments, a device executing the printing process in FIG. 3 is the CPU 310 of the terminal device 300. Instead of this, the device executing the printing process in FIG. 3 may be the CPU 210 of the printing system 200. Alternatively, the device executing the printing process in FIG. 3 may be, for example, a server configured to generate print job by obtaining image data from the printer and the terminal device and using the obtained image data. The server may be a plurality of computers communicatable with each other through the network.

In each of the above described embodiments, a part of configurations constituted by hardware may be replaced by software, and, conversely, a part or an entire of configurations constituted by software may be replaced by hardware. For example, the magnifying process of the bitmap data (executed at S65 in FIG. 3) of the printing process in FIG. 3, and the halftone process and the color conversion process of the generation process of the print data (executed at S70 in FIG. 3) may be, for example, executed by a specialized hardware circuit (for example, ASIC) operated by instructions of the CPU 310.

At S120 of the above described second embodiment, it is determined whether the length in the conveying direction AR of the sheet having the size defined by the user is greater than the reference length A. Instead of this, at S120, the printer driver may determine whether the length of the printing image in the conveying direction AR is greater than a predetermined reference length. In this case, for example, a value calculated by subtracting a length of a margin of the sheet from the length in the conveying direction AR of the registered sheet having the size defined by the user through the UI screen WI2 may be specified as the length of the printing image in the conveying direction AR. Alternatively, the size defined by the user registered through the UI screen WI2 may be, instead of the length of the sheet, a length of the printing image. In this case, the length in the conveying direction AR of the printing image registered through the UI screen WI2 is used as the length of the printing image in the conveying direction AR.

Each of manners of the UI screens of the second embodiment is one example, and may be changed appropriately. For example, instead of the checkbox CB2 for inputting the instruction of whether the resolution adjustment function is set to enabled or disabled, for example, a radio button configured to select one of a first rasterizing mode and a second rasterizing mode, resolution of which is lower than that of the first rasterizing mode, may be applied. In this case, for example, in a case where the first rasterizing mode is selected, the processes which are executed when the resolution adjustment function is set to disabled in the embodiments are executed, and in a case where the second rasterizing mode is selected, the processes which are executed when the resolution adjustment function is set to enabled in the embodiments are executed.

For example, the checkbox CB2 for inputting the instruction of whether the resolution adjustment function is set to enabled or disabled may be included in the main screen WI1b, instead of being included in the detail setting screen WI3b.

For example, the message MS6 included in the warning screen WI6b may be displayed in the preview screen WI5b.

For example, the warning screen WI6b may be displayed even when the preview screen WI5b is not displayed, that is, even when the preview function is set to disabled.

In the second embodiment, the preview recommendation screen WI4b is displayed at the timing when the sheet having the size defined by the user is registered through the UI screen WI2, the length in the conveying direction AR of which is greater than the reference length A. Instead of this, in a state in which (a) the sheet having the size defined by the user is registered, the length in the conveying direction AR of which is greater than the reference length A, and (b) the sheet having the size defined by the user is selected by the pull-down menu PM1, the preview recommendation screen WI4b may be displayed at the timing when the printing button BT1 is pushed.

One or more of the UI screens displayed in the second embodiment may be omitted appropriately. For example, either of or both of the display of the preview recommendation screens WI4b and the display of the warning screen WI6b may be omitted.

While the embodiments have been described above, it is to be understood that the disclosure is for easy understanding, and not limited to the details of the illustrated embodiments, but may be embodied with various changes, equivalents, and modifications, which may occur to those skilled in the art, without departing from the spirit and scope of the disclosure.

What is claimed is:

1. A non-transitory storage medium storing a plurality of instruction readable by a computer of an information processing apparatus,
wherein, when executed by the computer, the plurality of instruction cause the information processing apparatus to:
determine a generating condition for generating first bitmap data indicating a bitmap image such that a number of pixels of the bitmap image in a particular direction is less than or equal to a particular number;
obtain the first bitmap data satisfying the generating condition by using the generating condition, the obtained first bitmap data being data generated based on vector data generated by an application program;
determine a magnification condition for magnifying the first bitmap data based on condition information indicating a printing condition, the condition information including length information indicating a length in the particular direction of one of a printing image to be printed and a printing medium on which the printing image is printed;
obtain second bitmap data by using the magnification condition, the obtained second bitmap data being data generated by magnifying the first bitmap data based on the magnification condition; and
generate print data by using the second bitmap data,
wherein in a case where the length in the particular direction, indicated by the length information, of the one of the printing image and the printing medium is greater than a reference length,
determine the generating condition; and
determine the magnification condition such that the number of pixels in the particular direction, of the second bitmap data, corresponding to the length in the particular direction is generated.

2. The non-transitory storage medium according to claim 1, wherein, when executed by the computer, the plurality of instructions cause the information processing apparatus to determine the generating condition such that the number of pixels of the bitmap image in the particular direction is equal to the particular number.

3. The non-transitory storage medium according to claim 1,
wherein the generating condition includes resolution in the particular direction for generating the first bitmap data;

wherein the magnification condition includes a magnification factor for magnifying the first bitmap data; and wherein the resolution and the magnification factor in the particular direction are calculated by the following equations, A representing the reference length corresponding to the particular number, B representing the length in the particular direction of the one of the printing image and the print medium, C representing printing resolution in the particular direction of the printing image, D representing the resolution in the particular direction, E representing the magnification factor, $$D=(A/B)\times C$$

$$E=(B/A).$$

4. The non-transitory storage medium according to claim 1, wherein, when executed by the computer, the plurality of instructions cause the information processing apparatus to obtain the first bitmap data generated by a conversion program, the conversion program being configured to convert the vector data to the bitmap data and different from the plurality of instructions.

5. The non-transitory storage medium according to claim 1, wherein, when executed by the computer, the plurality of instructions cause the information processing apparatus to obtain the second bitmap data generated by executing a magnification process of magnifying the first bitmap data.

6. A non-transitory storage medium storing a plurality of instruction readable by a computer of an information processing apparatus, wherein, when executed by the computer, the plurality of instruction cause the information processing apparatus to:

determine a generating condition for generating first bitmap data indicating a bitmap image such that a number of pixels of the bitmap image in a particular direction is less than or equal to a particular number;

obtain the first bitmap data satisfying the generating condition by using the generating condition, the obtained first bitmap data being data generated based on vector data generated by an application program;

determine a magnification condition for magnifying the first bitmap data based on condition information indicating a printing condition;

obtain second bitmap data by using the magnification condition, the obtained second bitmap data being data generated by magnifying the first bitmap data based on the magnification condition;

generate print data by using the second bitmap data, obtain an instruction from an user by displaying a user interface screen including a first screen for obtaining an instruction of kind of bitmap data to be obtained based on the vector data;

when a first instruction is obtained through the first screen, obtain the first bitmap data, obtain the second bitmap data by using the obtained first bitmap data, and generate the print data by using the obtained second bitmap data; and when a second instruction is obtained through the first screen, obtain a third bitmap data by using a different condition from the generating condition based on the vector data and generate print data by using the third bitmap data, the third bitmap data being data satisfying the different condition, the number of pixels in the particular direction of the bitmap image indicated by the third bitmap data being greater than that of the bitmap image indicated by the first bitmap data.

7. The non-transitory storage medium according to claim 6, wherein the user interface includes a second screen for obtaining an instruction for designating a length in the particular direction of one of a printing image to be printed and a printing medium on which the printing image is printed; and when, executed by the computer, the plurality of instructions cause the information processing apparatus to obtain the instruction of the kind of bitmap data when the length in the particular direction designated through the second screen is greater than the reference length.

8. The non-transitory storage medium according to claim 6, wherein the user interface includes a second screen for obtaining an instruction for designating a length in the particular direction of one of a printing image to be printed and a printing medium on which the printing image is printed, a third screen including a preview screen configured to display the printing image to be printed, and a fourth screen for obtaining an instruction for determining whether the third screen is displayed or not before printing; and wherein, when executed by the computer, the plurality of instructions cause the information processing apparatus to obtain the instruction by displaying the fourth screen for obtaining the instruction for determining whether the third screen is displayed or not when the length in the particular direction designated through the second screen is greater than the reference length.

9. The non-transitory storage medium according to claim 6, wherein, when executed by the computer, the plurality of instructions cause the information processing apparatus to:

when the number of pixels in the particular direction of an image indicated by the third bitmap data is greater than the particular number, determine whether there is a monochrome region in an end in the particular direction of an image indicated by the third bitmap data, the monochrome region having the number of pixels in the particular direction greater than a predetermined length, the number of pixels in the particular direction of the image being determined by analyzing the third bitmap data; and when it is determined that there is the monochrome region in the end in the particular direction of an image, a length of which is greater than the predetermined length, display an message for warning the user.

10. The non-transitory storage medium according to claim 9, wherein, when executed by the computer, the plurality of instructions cause the information processing apparatus to display the message for warning together with a preview screen configured to display the printing image to be printed based on the third bitmap data.

11. The non-transitory storage medium according to claim 6, wherein, when executed by the computer, the plurality of instructions cause the information processing apparatus to determine the generating condition such that the number of pixels of the bitmap image in the particular direction is equal to the particular number.

12. The non-transitory storage medium according to claim 6, wherein, when executed by the computer, the plurality of instructions cause the information processing apparatus to obtain the first bitmap data generated by a conversion program, the conversion program being configured to convert the vector data to the bitmap data and different from the plurality of instructions.

13. The non-transitory storage medium according to claim 6, wherein, when executed by the computer, the plurality of instructions cause the information processing apparatus to obtain the second bitmap data generated by executing a magnification process of magnifying the first bitmap data.

14. A print data generating apparatus, comprising:
a display; and
a controller configured to:
- determine a generating condition for generating first bitmap data indicating a bitmap image such that a number of pixels of the bitmap image in a particular direction is less than or equal to a particular number;
- obtain the first bitmap data satisfying the generating condition by using the generating condition, the obtained first bitmap data being data generated based on vector data generated by an application program;
- determine a magnification condition for magnifying the first bitmap data based on condition information indicating a printing condition, the condition information including length information indicating a length in the particular direction of one of a printing image to be printed and a printing medium on which the printing image is printed;
- obtain second bitmap data by using the magnification condition, the obtained second bitmap data being data generated by magnifying the first bitmap data based on the magnification condition; and
- generate print data by using the second bitmap data, wherein in a case where the length in the particular direction, indicated by the length information, of the one of the printing image and the printing medium is greater than a reference length,
- determine the generating condition; and
- determine the magnification condition such that the number of pixels in the particular direction, of the second bitmap data, corresponding to the length in the particular direction is generated.

* * * * *

UNITED STATES PATENT AND TRADEMARK OFFICE
CERTIFICATE OF CORRECTION

PATENT NO. : 11,651,178 B2
APPLICATION NO. : 17/514189
DATED : May 16, 2023
INVENTOR(S) : Ryota Kakitsuba et al.

It is certified that error appears in the above-identified patent and that said Letters Patent is hereby corrected as shown below:

On the Title Page

Item (57) Abstract, Line 2 should read:
instructions readable by a computer of an information pro-
Item (57) Abstract, Line 4 should read:
plurality of instructions cause the information processing
Item (57) Abstract, Line 6 should read:
number of pixels of a bitmap image in a particular direct-
Item (57) Abstract, Line 7 should read:
tion is less than or equal to a particular number, obtain In the Claims Column 20, Claim 1, Line 23 should read:
instructions readable by a computer of an information pro-
Column 20, Claim 1, Line 26 should read:
instructions cause the information processing apparatus
Column 21, Claim 6, Line 31 should read:
instructions readable by a computer of an information pro-
Column 20, Claim 6, Line 34 should read:
instructions cause the information processing apparatus
Column 22, Claim 7, Line 14 should read:
the second screen is greater than a reference length.
Column 22, Claim 8, Line 32 should read:
screen is greater than a reference length.

Signed and Sealed this
Twelfth Day of March, 2024

Katherine Kelly Vidal
*Director of the United States Patent and Trademark Office*